(No Model.) 2 Sheets—Sheet 1.
H. L. HAYES.
BRICK KILN.
No. 516,306. Patented Mar. 13, 1894.
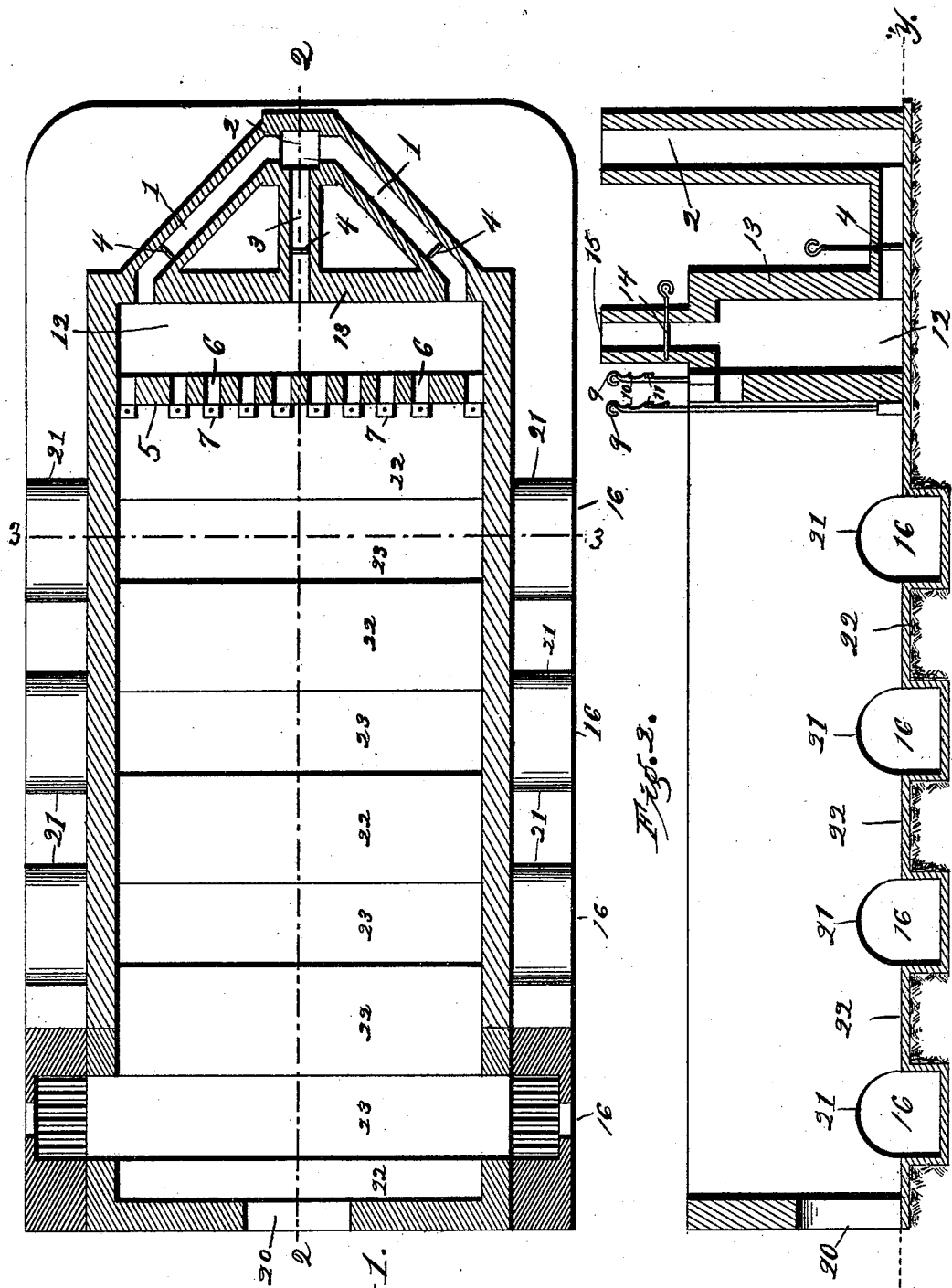
WITNESSES:
F. G. Fischer
M. P. Smith
INVENTOR:
Hardy L. Hayes
By Higdon & Higdon
ATTYS.

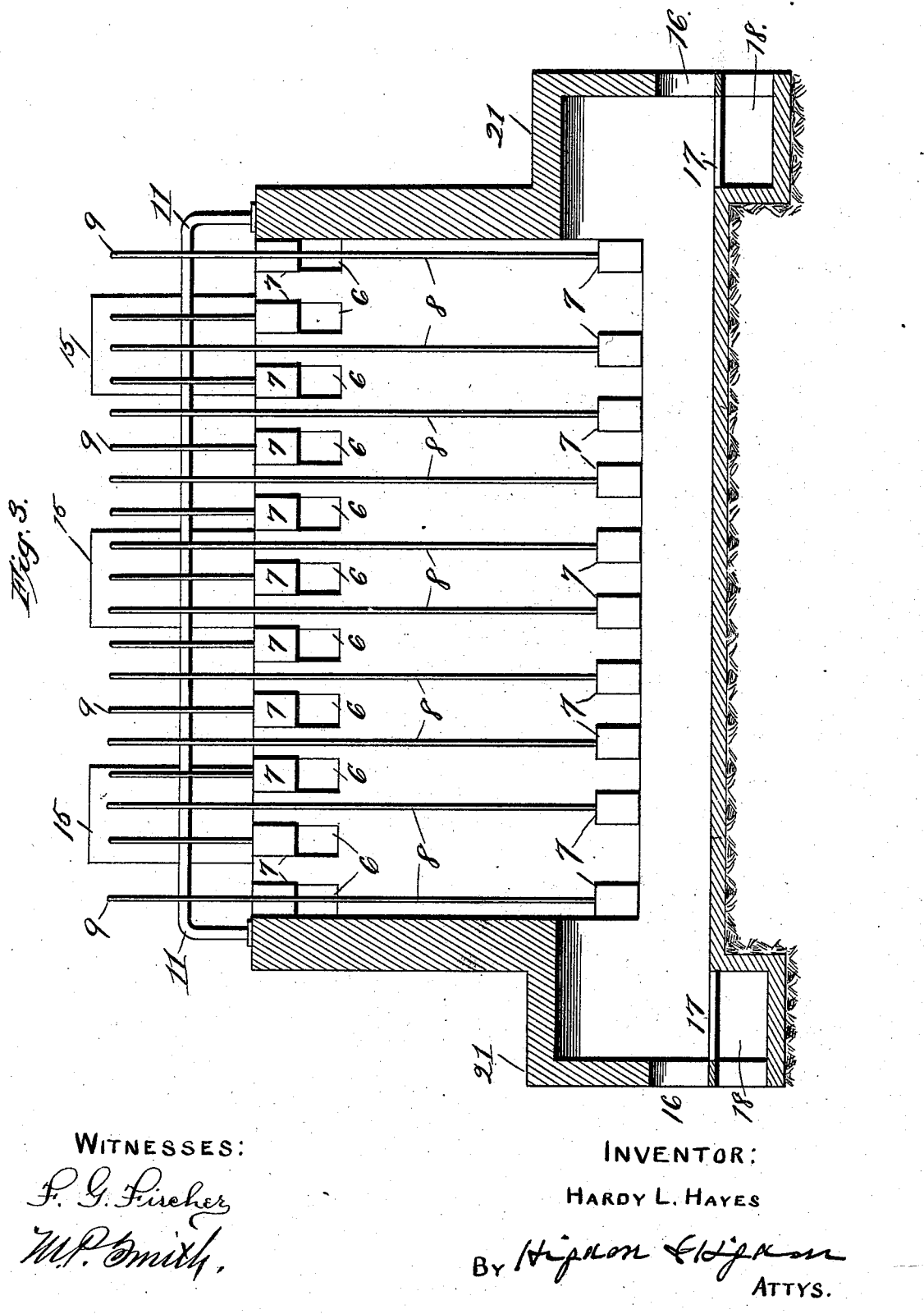

UNITED STATES PATENT OFFICE.

HARDY L. HAYES, OF ST. JOSEPH, MISSOURI.

BRICK-KILN.

SPECIFICATION forming part of Letters Patent No. 516,306, dated March 13, 1894.

Application filed March 16, 1893. Serial No. 466,288. (No model.)

*To all whom it may concern:*

Be it known that I, HARDY L. HAYES, of St. Joseph, Buchanan county, Missouri, have invented certain new and useful Improvements in Brick-Kilns, of which the following is a full, clear, and exact description, reference being had to the accompanying drawings, forming a part hereof.

My invention relates to improvements in brick kilns, and the object of my invention is to produce a kiln wherein the entire quantity of brick within the kiln, may be burned to a uniform degree, and also to provide means whereby the attendant may easily direct and control the draft therethrough.

With this object in view, my invention consists in certain novel features of construction and arrangement of its parts, as hereinafter described and claimed.

Referring to the drawings, Figure 1, represents a horizontal section of a brick-kiln, constructed in accordance with my invention, and taken on the line $y-y$ of Fig. 2. Fig. 2, is a vertical sectional view, taken on the line $z-z$ of Fig. 1. Fig. 3, is a vertical cross-section of the kiln, taken on the line $x-x$ of Fig. 1, to show clearly the arrangement of the draft openings and the dampers, therefor.

In the said drawings, the kiln is shown of usual rectangular form, and having draft passages 23 extending transversely of the floor 22 and communicating with the furnaces 16 at opposite sides of the kiln. These furnaces are arranged at suitable intervals throughout the length of the kiln, are arched at 21, and are provided with the grate 17 and ash-pit 18 of the usual construction. An opening or door passage 20 is formed through one of the end-walls of the kiln, and is sufficiently large to allow a brick-wagon to pass therethrough, and a stack 2 is erected a short distance outward of the other end-wall. A pair of air-ducts 1 communicate with opposite sides of the stack, at its lower end, and also communicate with openings formed through the adjacent end-wall 13 of the kiln, and near its lower corners. A centrally arranged air-duct 3, also communicates with an opening formed through the said end wall and midway between the first-mentioned openings, and this air-duct 3 also communicates with the lower end of the stack. These air ducts are controlled by dampers 4. A partition wall 5 is vertically arranged a suitable distance inward of the end-wall 13 to form a chamber 12, and communicating with the upper portion of this chamber are chimneys or stacks 15, controlled by dampers 14 of the usual construction and arrangement. A series of openings 6, horizontally aligned, are formed at suitable intervals through the upper portion of the partition, and open up communication between the chamber 12 and the interior of the body-portion of the kiln. A series of slide-dampers 7 vertically arranged are adapted to control the passage of air through said openings, and these dampers are provided with the vertical and upwardly extending rods which passing through the roof are formed with handle loops 9 at their upper ends. A similar series of passages arranged alternately with the upper passages, is formed through the lower portion of the partition, and these passages are also closed by slide-dampers 7. These dampers are provided with the long vertical rods 8, extending upward through the roof, and these rods are also formed with handle loops 9, at their upper ends. A pair of inverted U-bars are secured transversely of and to the roof, and the damper-rods are formed with offsets or shoulders 10, one or the other of which is adapted to engage upon the bridge-portion of one of said U-bars, accordingly as more or less draft is desired to pass through said openings.

In the process of burning the brick, I fire first in the furnace near the end-wall having the opening 20, and by closing the lower series of openings 6, I cause the draft to travel obliquely from the front and lower portion to the rear and upper portion of the kiln, toward the upper series of passages 6, which are of course open. To more effectually accomplish this, I close the air-duct 1 and 3, and operate the dampers 14 to leave the passages 15 open. Should it be desired to direct the draft more to one side than the other, the dampers or a number of them, at the side where the draft is not needed, or where only a slight draft is required, are operated to close or partially close the passages at that side; or the passages at each side may be closed and the middle ones left open. By closing the middle dampers, it will be seen that the brick near the sides and corners of the kiln may be subjected to a strong draft, or any draft required. Now, when the brick in the upper portion of the kiln are sufficiently burned, by closing all or a suitable number of the upper, and opening all or a suitable number of the lower passages, the draft may be directed toward the lower series of passages 6, and it is preferable also, to close the passages 15, and open the air-ducts 1 and 3, or any of them. Also by manipulating the lower series of dampers, as explained with reference to the upper ones, the draft may be controlled and directed at will. After the brick in the front end of the kiln have been burned to suitable and uniform degree of hardness the fires in the first furnaces are allowed to die out, and the remaining furnaces lighted in the order of succession, and after suitable intervals of time, and a team may be backed through the door passage 20, to receive a load of brick. By the above described manner of manipulating the dampers, it will be seen that the draft may be controlled and directed at will, into any part of the kiln, and that the brick, therefore, may be burned to a uniform hardness throughout the kiln. It will be further seen that a kiln thus constructed, is simpler, and incomparably cheaper than a kiln having a multiplicity of intersecting air-passages as kilns are usually built.

Having thus described my invention, what I claim as new, and desire to secure by Letters Patent, is—

1. A brick-kiln, having a vertical partition near one end dividing the kiln into a brick-burning compartment and an air compartment, and air-escape flues or chimneys communicating with the air compartment, and a series of passages formed through the upper portion of the partition, and a series of passages formed through the lower portion of the partition, said passages each communicating with the brick-burning and air-compartments, and dampers controlling said passages, substantially as set forth.

2. A brick-kiln, having a vertical partition near one end dividing said kiln into two compartments, an upper series of passages formed through said partition, and a lower series of passages formed through said partition, and independent dampers controlling each passage of each series, and rods connected to said dampers and having off-sets or shoulders, and bars adapted to be engaged by said off-sets or shoulders, substantially as set forth.

3. In a brick-kiln, the combination with a body-portion having furnaces, and draft-passages, and a compartment at one end, and communicating with the interior of the body-portion, through an upper and a lower series of passages connecting the interior of the body-portion and the compartment, and air-ducts controlled by dampers, and leading from the lower end of the compartment, and chimneys controlled by dampers leading from the upper end of said compartment, substantially as and for the purpose set forth.

In testimony whereof I affix my signature in the presence of two witnesses.

HARDY L. HAYES.

Witnesses:
L. R. LANCASTER,
M. I. HUMISTON.